US011212697B2

(12) United States Patent
Faheem et al.

(10) Patent No.: US 11,212,697 B2
(45) Date of Patent: Dec. 28, 2021

(54) ADAPTIVE QUALITY OF SERVICE FOR LATENCY-SENSITIVE APPLICATIONS

(71) Applicant: Apple Inc., Cupertino, CA (US)

(72) Inventors: Faraz Faheem, Santa Clara, CA (US); Jianxiong Shi, Dublin, CA (US); Li Su, San Jose, CA (US); Sreevalsan Vallath, Dublin, CA (US); Yingjie Zhao, Pleasanton, CA (US); Yaoqi Yan, Beijing (CN); Jishan Gao, Beijing (CN)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 16/707,696

(22) Filed: Dec. 9, 2019

(65) Prior Publication Data

US 2020/0213896 A1    Jul. 2, 2020

Related U.S. Application Data

(60) Provisional application No. 62/787,525, filed on Jan. 2, 2019.

(51) Int. Cl.
*H04W 28/02* (2009.01)
*H04M 15/00* (2006.01)
*H04W 24/08* (2009.01)
*H04W 76/10* (2018.01)

(52) U.S. Cl.
CPC ... *H04W 28/0268* (2013.01); *H04M 15/8016* (2013.01); *H04W 24/08* (2013.01); *H04W 76/10* (2018.02)

(58) Field of Classification Search
None
See application file for complete search history.

(56) References Cited

U.S. PATENT DOCUMENTS

| 8,139,598 | B2 | 3/2012 | Holmstrom et al. |
| 9,094,812 | B2* | 7/2015 | Marsico ................. H04W 8/20 |
| 9,094,943 | B2 | 7/2015 | Klingenbrunn et al. |
| 10,419,976 | B2 | 9/2019 | MacKinney et al. |
| 2007/0047452 | A1* | 3/2007 | Lohr ..................... H04L 1/1829 |
| | | | 370/242 |
| 2009/0040925 | A1* | 2/2009 | Holmstrom .......... H04L 47/801 |
| | | | 370/230 |

(Continued)

*Primary Examiner* — Ayanah S George
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment (UE) device to adaptively enhance the quality of service (QoS) configuration of a bearer of communications conducted over a cellular network between a UE application and a server. The UE may use various information, including a QoS profile associated with the application, to determine requested QoS parameters and/or whether the UE is permitted to request or access enhanced QoS functionality. The UE may then send a request to the cellular network indicating the requested QoS parameters, and the network may adjust the QoS configuration of the bearer in response. The UE and the network may perform routine QoS measurements and exchange information in order to adaptively maintain and optimize the QoS configuration. These techniques may tend to provide more appropriate QoS to the application, which may improve user experience.

20 Claims, 7 Drawing Sheets

(56) References Cited

U.S. PATENT DOCUMENTS

2014/0016464 A1* 1/2014 Shirazipour ............ H04L 47/24
                                                     370/235
2016/0065453 A1* 3/2016 Bhogal ................. H04L 45/302
                                                     370/235
2020/0213896 A1   7/2020 Faheem et al.

* cited by examiner

| Parameter | Object | Description |
|---|---|---|
| Length | Byte | – |
| EPS Index | Byte | Index of EPS Bearer to Enhance |
| Latency Target | Byte | Latency (ms) |
| Jitter Target | Byte | Jitter (ms) |
| Additional Parameters | Byte | Used if EPS Index is Default Bearer |
| Add. Parameters Length | Byte | Length of Additional Parameters (in Bytes) |
| App_Index | Byte | Index of Application |
| Flow | 10 Bytes / 34 Bytes | Flow Identifier |
| Time | Byte | NTP Time (ms) Mode 256 |
| QoS_MAC | 128 Bits | Message Authentication Certification (MAC) |

FIG. 8

ADAPTIVE QUALITY OF SERVICE FOR LATENCY-SENSITIVE APPLICATIONS

PRIORITY CLAIM

The present application claims benefit of priority to U.S. provisional patent application No. 62/787,525 titled "Adaptive Quality of Service for Latency-Sensitive Applications" filed on Jan. 2, 2019, which is hereby incorporated by reference in its entirety as though fully and completely set forth herein.

TECHNICAL FIELD

The present application relates to wireless devices, and more particularly to an apparatus, system, and method for enhancing the quality of service (QoS) of wireless communications for latency-sensitive applications on a user equipment (UE) device.

DESCRIPTION OF THE RELATED ART

Wireless communication systems are rapidly growing in usage. Wireless devices, particularly wireless user equipment (UE) devices, have become widespread. Additionally, there are a variety of applications (or apps) hosted on UE devices that perform or depend on wireless communication, such as applications that provide messaging, email, browsing, video streaming, voice streaming, real-time gaming, or various other online services.

In some instances, a UE device may perform a process that demands a certain level of service quality, or quality of service (QoS), for process-related wireless communications. For example, the UE may host a latency-sensitive application that may be particularly sensitive to delays in application-related communications, and that may benefit from a certain QoS configuration. However, in some cases, the UE (or application) may lack flexibility in determining and adjusting the QoS configuration of application-specific communications conducted over a wireless network. Low or otherwise inadequate QoS of communications performed for latency-sensitive applications may lead to poor user experience, or poor quality of experience (QoE). Thus, improvements in the field are desirable.

SUMMARY

Techniques are disclosed for a user equipment (UE) device that may desire an enhanced quality of service (QoS) for certain wireless communications associated with an application executing on the UE. The UE may comprise at least one antenna for performing wireless communications, a radio coupled to the at least one antenna, and a processing element coupled to the radio, and may be configured to communicate in a wireless fashion with a cellular network via at least one type of radio access technology (RAT).

The application executing on the UE may be a latency-sensitive application that performs latency-sensitive wireless communications, and may require or benefit from a certain level of QoS or a certain QoS configuration for certain communications. The application executing on the UE may operate in conjunction with a remote server that provides content (data) for use in the application. For example, the application may be an online or real-time game application, whose gameplay performance may, in some circumstances, demand, or at least benefit from, wireless communications between the server and the UE that are low-latency to a certain degree.

According to some embodiments, the UE may establish a "pipeline" or bearer with the cellular network for conducting traffic between the application executing on the UE and a server associated with the application, i.e., an application server. The UE may determine whether the application is eligible for an enhanced quality of service (QoS) configuration of the bearer of the traffic, i.e., the application traffic. The UE may use various means to determine requested QoS configuration parameters and/or to determine whether the application is eligible for an enhanced QoS configuration. In some embodiments, the server (the application server) may indicate requested QoS parameters to the application. In some embodiments, the UE may access a "QoS policy" profile associated with the application stored on the UE, the circumstances of certain processes of the application, and/or a user profile associated with a user of the application (or of the UE), among other factors.

The UE may transmit information to the cellular network indicating requested QoS configuration parameters in response to a determination that the application is eligible for the enhanced QoS configuration. In some embodiments, this information may include a target latency and a target jitter, among other possible parameters. In response, the cellular network may adjust the QoS configuration of the bearer based on the requested QoS parameters. The UE and the cellular network may then perform wireless communications via the bearer according to the enhanced QoS configuration.

In some embodiments, the UE may perform a procedure to periodically measure QoS of the application traffic, i.e., may perform QoS measurements of the bearer of the application traffic. For example, the UE may measure the latency of communications over the bearer and then may communicate the QoS measurement (i.e., results of the QoS measurement procedure) to the cellular network. In response, the network may then modify the QoS configuration of the bearer. In some embodiments, the network may consider various other factors in order to determine or modify the QoS configuration of the barrier, such as other network traffic conditions or other QoS measurements taken by the network. Thus, during execution of the application, the UE may repeatedly perform a QoS measurement of the bearer and communicate the QoS measurement to the cellular network in order to inform network adjustments of the bearer's QoS configuration. The operation and frequency of this measurement and measurement report process may depend on various factors.

In some embodiments, a non-transitory memory medium may include program instructions executable by a UE that, when executed, cause the UE to perform at least a portion or all of the above operations. In some embodiments, a method performed by the UE may include the UE performing the above operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present patent application:
  UE: User Equipment
  BS: Base Station
  ENB: eNodeB (Base Station)
  LTE: Long Term Evolution
  UMTS: Universal Mobile Telecommunications System
  RAT: Radio Access Technology
  RAN: Radio Access Network
  E-UTRAN: Evolved UMTS Terrestrial RAN
  CN: Core Network
  EPC: Evolved Packet Core
  MME: Mobile Management Entity
  HSS: Home Subscriber Server
  SGW: Serving Gateway
  PS: Packet-Switched
  CS: Circuit-Switched
  EPS: Evolved Packet-Switched System
  RRC: Radio Resource Control
  IE: Information Element
  QoS: Quality of Service
  QoE: Quality of Experience

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 1:
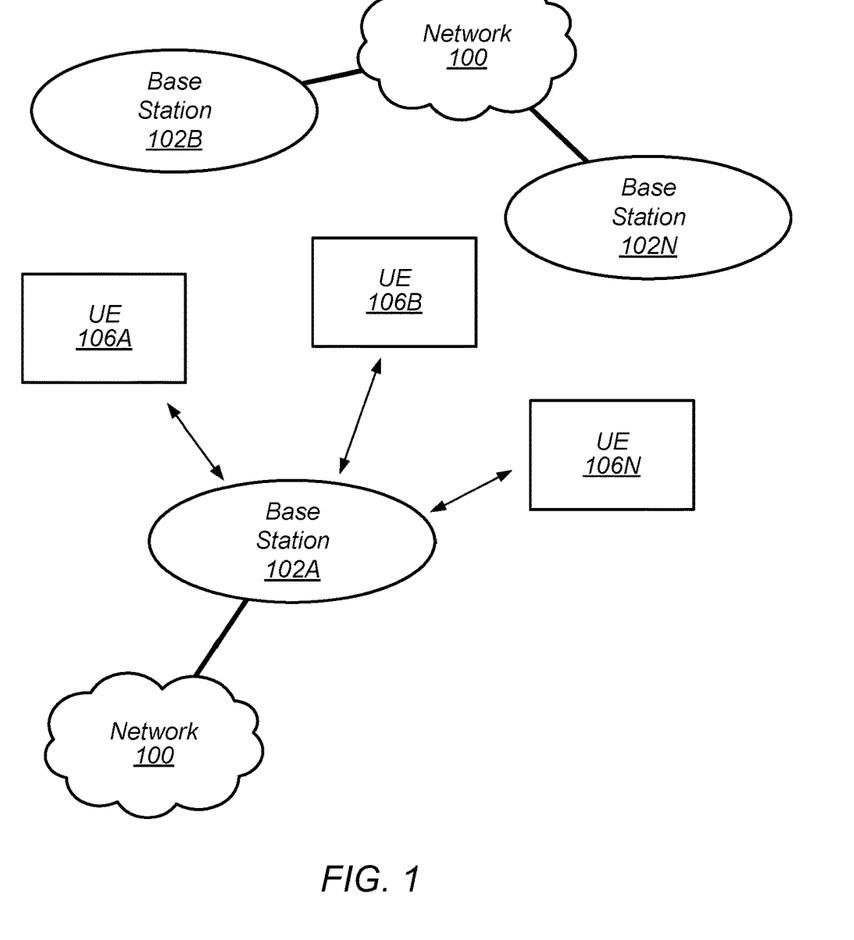
FIG. 1 illustrates a simplified example wireless communication system.
Figure 2:
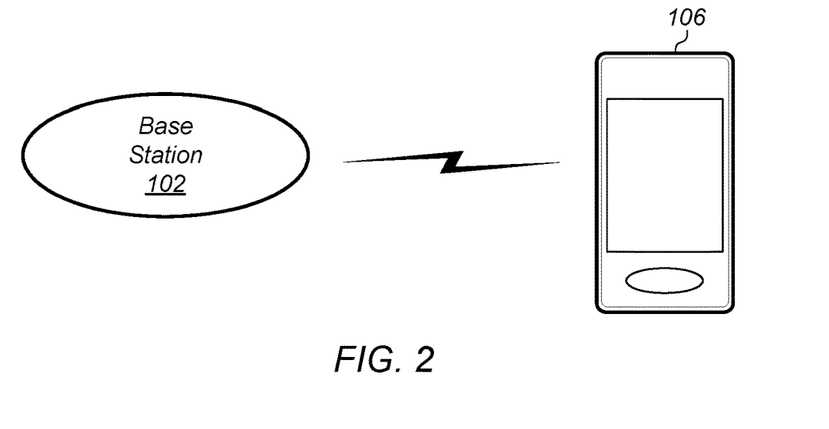
FIG. 2 illustrates a base station in communication with user equipment (UE)

FIGS. 1 and 2—Communication System

FIG. 1 illustrates a simplified example wireless cellular communication system. It is noted that the system of FIG. 1 is merely one example of a possible cellular communication system, and embodiments may be implemented in various systems.

As shown, the example wireless cellular communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100.

The base station 102 and the UEs may be configured to communicate over the transmission medium using any of various wireless communication technologies, including cellular radio access technologies (RATs) such as GSM, UMTS, LTE, LTE-Advanced, CDMA, W-CDMA, and any of various 3G, 4G, 5G or future telecom standards. One or more base stations 102 implementing RATs may comprise a radio access network (RAN).

Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards.

FIG. 2 illustrates user equipment (UE) 106 (e.g., one of the devices 106A through 106N) in communication with the base station 102. As defined above, the UE 106 may be a device with wireless cellular network connectivity such as a mobile phone, a hand-held device, a computer or a tablet, or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof.

The UE may include a processing element such as one or more of a processor, an ASIC (application specific integrated circuit), an FPGA (field-programmable gate array) or some combination thereof. The UE, e.g., the processing element in the UE, may perform any of the methods described herein as being performed by a UE.

In some embodiments, the UE 106 may be configured to communicate using any of one or more wireless communication protocols as described above. The UE 106 may include one or more antennas for communicating using one or more wireless communication protocols. The UE may be associated with, e.g., subscribe to, a cellular carrier. Examples of cellular carries in the United States include Verizon, AT&T, Sprint, and T-Mobile.

Figure 3:
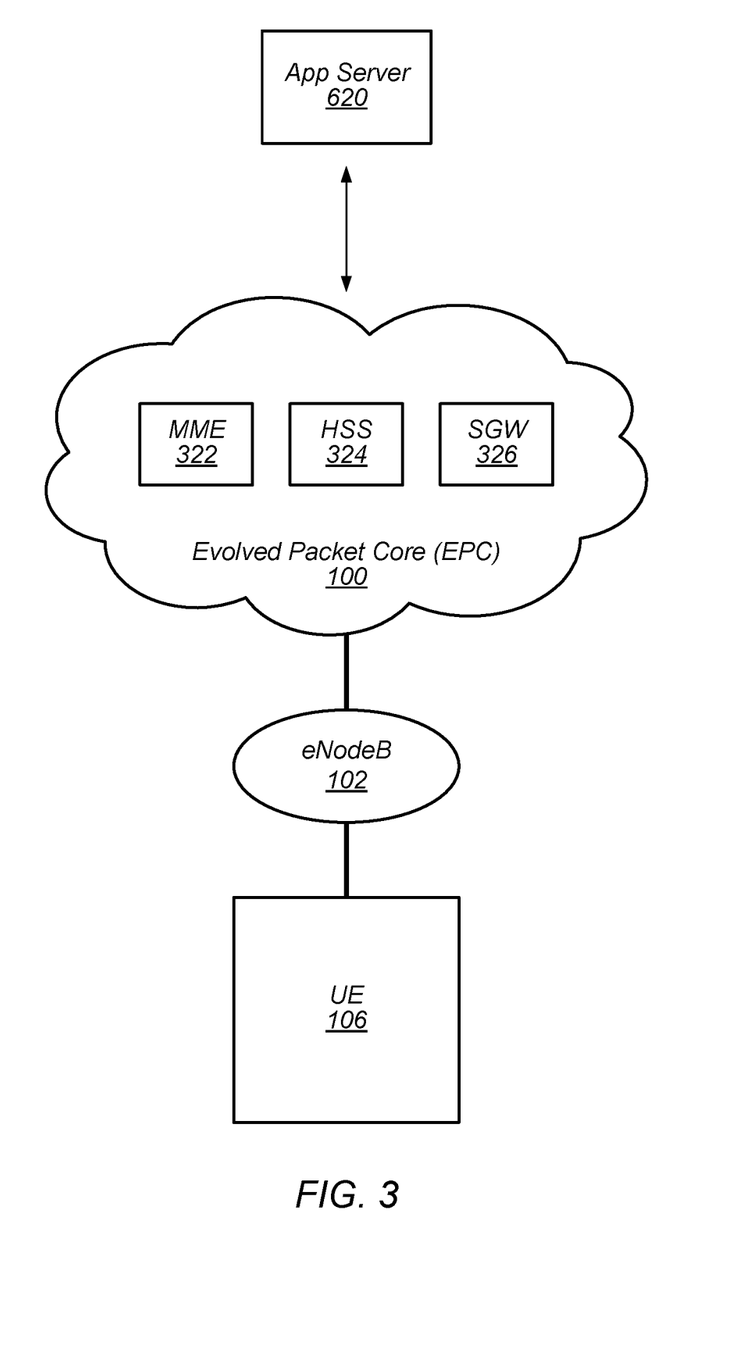
FIG. 3 illustrates an example cellular network system, according to some embodiments.

FIG. 3—Wireless Communication System

FIG. 3 illustrates an example simplified portion of a wireless communication system. The UE 106 may be in communication with a wireless network, e.g., a radio access network (RAN), which may include one or more base stations 102 and may provide connection to a core network (CN), such as an evolved packet core (EPC) 100, as shown. The base station in this example embodiment is shown as an eNodeB 102. The UE 106 may communicate in a wireless manner with the base station (eNodeB) 102. In turn, the base station 102 may be coupled to a core network, shown in this example embodiment as an evolved packet core (EPC) 100. As shown, the EPC 100 may include a mobility management entity (MME) 322, a home subscriber server (HSS) 324, and a serving gateway (SGW) 326. The EPC 100 may also include various other devices known to those skilled in the art.

Operations described herein as being performed by the cellular network may be performed by one or more of the network devices shown in FIG. 3, such as one or more of the base station 102 or the EPC 100, and/or the MME 322, HSS 324, or SGW 326 in the EPC 100, among other possible devices. Operations described herein as being performed by the radio access network (RAN) may be performed, for example, by the base station 102, or by other components of the RAN usable to connect the UE and the CN.

As shown, a server 620 may be coupled to the network, e.g., to the core network or EPC 100. The server 620 may be configured to provide (send and/or receive) data (or content) through the network 100 and the base station 102 to an application executing on a UE 106 to facilitate the execution of the application. Thus, the server may sometimes be referred to as the application server (or app server). For example, where the application executing on the UE 106 is an online game, the application may be configured to connect to the server 620 during execution of the game, e.g., to receive and display content from the server 620 and provide user input to the server 620. During execution of the application on the UE 106, e.g., during gameplay, it may be desirable to have at least a certain quality of service (QoS) on the connection (or bearer) between the application and the server, so that the user playing the game has a good quality of experience in terms of interacting with the game.

Figure 4:
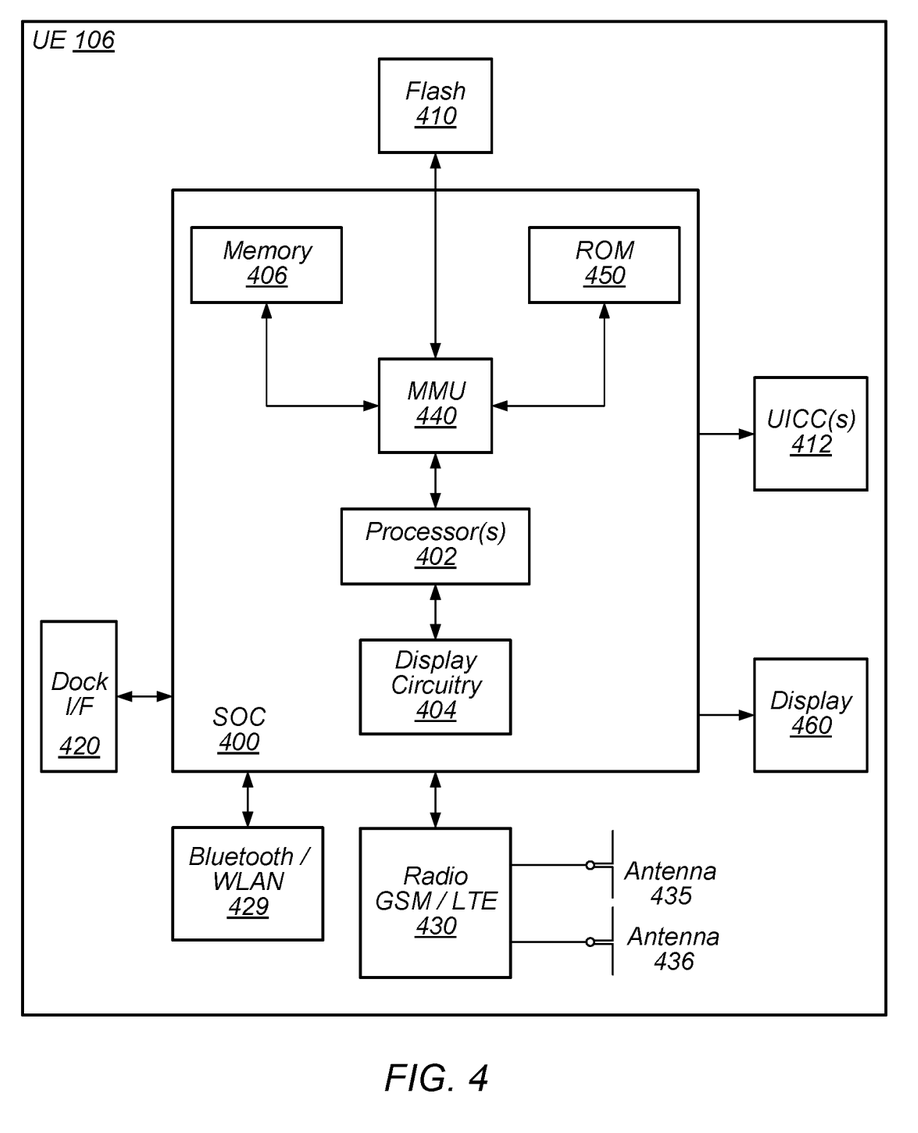
FIG. 4 is an example block diagram of a UE, according to some embodiments.

FIG. 4—Example Block Diagram of a UE

FIG. 4 is an example block diagram of a UE 106. As shown, the UE 106 may include a system on chip (SOC) 400, which may include portions for various purposes. For example, as shown, the SOC 400 may include a processing element, such as processor(s) 402 which may execute program instructions for the UE 106 and display circuitry 404 which may perform graphics processing and provide display signals to the display 440. The processor(s) 402 may also be coupled to memory management unit (MMU) 440, which may be configured to receive addresses from the processor(s) 402 and translate those addresses to locations in memory (e.g., memory 406, read-only memory (ROM) 450, NAND flash memory 410) and/or to other circuits or devices, such as the display circuitry 404, radio 430, connector I/F 420, and/or display 440. The MMU 440 may be configured to perform memory protection and page table translation or setup. In some embodiments, the MMU 440 may be included as a portion of the processor(s) 402.

In the embodiment shown, ROM 450 may include a bootloader, which may be executed by the processor(s) 402 during boot-up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 440, and wireless communication circuitry (e.g., for LTE, LTE-A, CDMA2000, GSM, Bluetooth, Wi-Fi, etc.).

The UE device 106 may include at least one antenna, and in, some embodiments, multiple antennas, for performing wireless cellular communication with base stations and/or wireless communication with other devices. For example, the UE device 106 may use antenna 435 to perform the wireless cellular communication and may use antenna 436 for other wireless communication. As noted above, the UE may be configured to communicate wirelessly using multiple wireless communication standards (multiple RATs) in some embodiments.

As described herein, the UE 106 may include a processing element, e.g., hardware and/or software components for implementing methods according to embodiments of this disclosure.

A processing element of the UE device 106, e.g., the processor 402, may be configured to implement part or all of the methods described herein, e.g., by executing program instructions stored on a memory medium (e.g., a non-transitory computer-readable memory medium). In other embodiments, the UE processing element may be configured as a programmable hardware element, such as an FPGA (Field Programmable Gate Array), or as an ASIC (Application Specific Integrated Circuit).

The UE 106 may store and/or execute various types of application software, i.e., applications or apps. As used herein, an application or app may be one of various software programs stored on and/or executed by the UE that performs coordinated functions, tasks, or activities. Applications, or apps, may include system software programs, mobile apps, game applications, or various other software on the UE.

Some applications executed on the UE may perform wireless communications. These may include applications that provide messaging, email, browsing, video streaming, voice streaming, real-time or online gaming, or various other online services or services that perform wireless communication with a network. As detailed further below, some applications that perform wireless communications may have quality of service (QoS) requirements for certain communications. For example, a latency-sensitive app on the UE may desire a high level of QoS, or high QoS, for certain app-related communications conducted over a network. Embodiments detailed further below relate to devices and methods for achieving adaptive, enhanced QoS for UE applications that perform wireless communications with QoS requirements.

Figure 5:
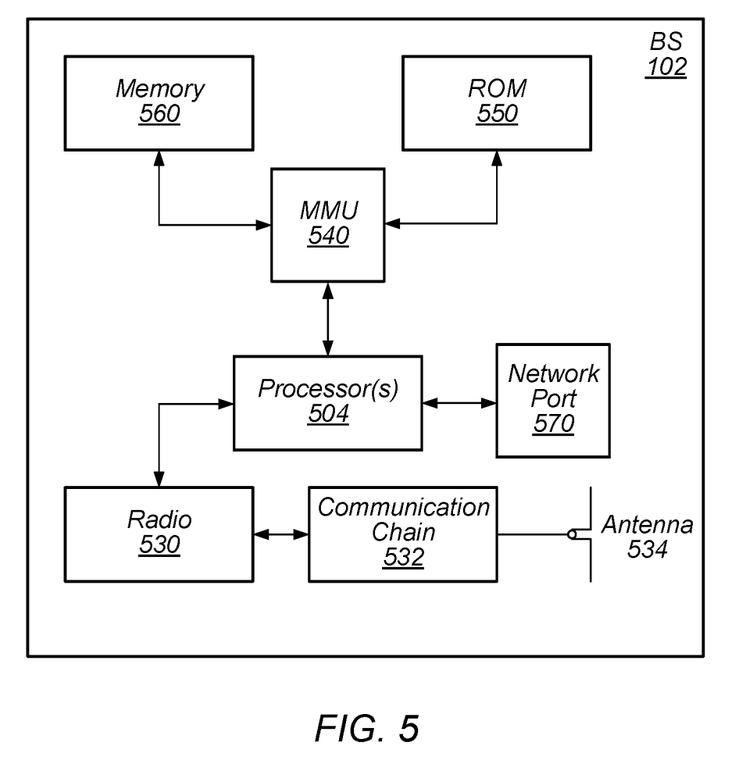
FIG. 5 is an example block diagram of a base station, according to some embodiments.

FIG. 5—Base Station

FIG. 5 is an example block diagram of a base station 102. It is noted that the base station of FIG. 5 is merely one example of a possible base station. As shown, the base station 102 may include a processing element, such as processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read-only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534. The at least one antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc. A base station implementing a RAT may constitute a component of a radio access network (RAN), which may provide connectivity between the UE devices 106 and a core network.

The processing element, such as processor(s) 504, of the base station 102 may be configured to implement part or all of the methods described herein, e.g., by executing program instructions stored on a memory medium (e.g., a non-transitory computer-readable memory medium). Alternatively, the processing element may be configured as a programmable hardware element, such as an FPGA (Field Programmable Gate Array), or as an ASIC (Application Specific Integrated Circuit), or a combination thereof.

Figure 6:
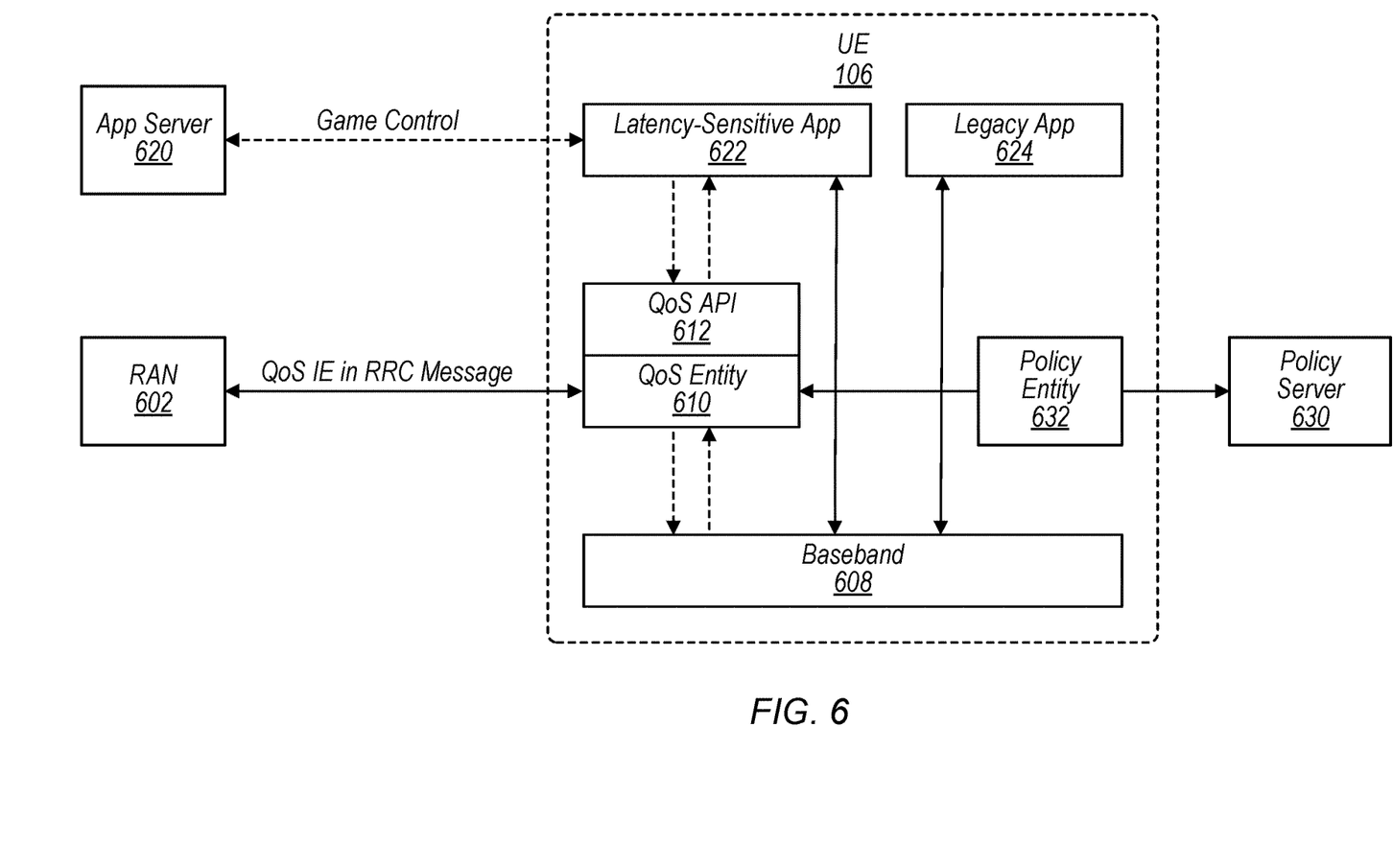
FIG. 6 is an example block diagram illustrating simplified communications and relationships between various UE entities and/or networked entities usable to provide enhanced quality of service (QoS) for a latency-sensitive application, according to some embodiments.

FIG. 6—UE with Latency-Sensitive Application

FIG. 6 is a block diagram illustrating example relationships between various UE and/or network and other entities usable for providing enhanced quality of service (QoS) for certain wireless communications of a latency-sensitive application. It is noted that FIG. 6 merely illustrates relationships among certain example UE-side and networked or external entities and should not be construed to narrow the scope or spirit of the subject matter described herein, and that various other embodiments of such systems and methods are possible.

Shown centrally is a UE 106 (e.g., the UE 106 in FIGS. 1-4), which contains various components and entities, i.e., UE or UE-side entities. The UE 106 (referred to simply as "the UE" in the following description) may be connected to a cellular network, e.g., via a radio access network (RAN) 602 as shown. The RAN 602 may be considered a component of the cellular network. Among performing other functions, the RAN may provide connectivity between the UE and a core network of the cellular network. The UE may be camped on a base station (e.g., the base station 102 in FIG. 1, 2, 3, or 5) that constitutes part of the RAN 602. The UE may communicate with the RAN, e.g., the base station, using a variety of radio access technologies (RATs). For example, the UE may communicate with the RAN using the LTE RAT. In the case of some LTE embodiments, the RAN may constitute an Evolved UMTS Terrestrial Radio Access (E-UTRA) Network, i.e., an E-UTRAN.

The UE may include a baseband (or baseband processor) 608 for conducting wireless communications. Thus, as shown, information may be conveyed between various UE entities and the baseband processor 608, so that information may flow between the UE entities and the networked/external entities. Thus, while FIG. 6 indicates relationships between UE entities and external entities, these relationships are simplified representations of the flow of certain relevant information, and it is understood that communications between the UE entities and external entities are conducted by various intermediary components, such as one or more antennas on the UE, the baseband processor 608, and one or more network devices such as the RAN 602.

The UE may store and execute various types of application software, i.e., applications or apps, that perform wireless communications. These may include applications that provide messaging, email, browsing, video streaming, voice streaming, real-time or online gaming, or various other online services or services that perform wireless communication with a network. Here it is noted that when it is said that a UE-side application performs wireless communication, it is understood that, more particularly, certain application processes cause the UE to perform said wireless communications for the application. Communications performed by a certain UE-side application or app, i.e., performed by the UE for the application, may be termed, e.g., application traffic or application communications, or application-specific or application-related communications (or traffic, etc.).

Certain applications that perform wireless communications may require or benefit from a certain level of communication service quality, or quality of service (QoS). As used herein, QoS may refer generally to a configuration of various network mechanisms that control the priority, speed, latency, jitter, reliability, and/or other qualities of certain traffic, e.g., of a certain pipeline or bearer of communications, and/or may refer to the level of performance or quality experienced by certain traffic conducted over a network, as well as this performance's impact on devices, users, applications, etc. that may be participating in the communications. For example, the latency-sensitive app 622 may desire a high level of QoS, or high QoS, for certain app-related communications conducted over the cellular network. In other words, certain functionality of the latency-sensitive app 622 may demand (or benefit from) communications that are low-latency and reliable to a certain degree. Hence, the app may benefit from a certain QoS, or QoS configuration, e.g., a certain configuration of network traffic prioritization, resource reservation control, and other mechanisms and parameters intended to achieve a targeted level of communication performance, or QoS.

Communications performed by the latency-sensitive app 622 may be conveyed over a certain communication "pipeline" or bearer of the cellular network. For example, in LTE embodiments, the bearer may be an EPS (Evolved Packet-Switched System) bearer. The bearer may be a dedicated bearer associated with an initial QoS configuration, e.g., an EPS dedicated bearer. The app 622 may communicate information over the bearer to the RAN 602, which may route communications to a server 620, i.e., the app server 620. Hence, the app 622 may exchange information with the app server 620, as shown. It is noted that when it is said that the UE (or app, etc.) communicates or performs or conducts communications, the UE (or app, etc.) may send, receive, and/or both send and receive communications at various times and in various contexts.

Some wireless communications technologies include mechanisms for configuring certain QoS parameters for different types of network traffic. For example, the 3GPP TS 23.203 standard includes a QoS Class Identifier (QCI) mechanism that specifies QoS parameters for various categories or classes of service, such as conversational voice, conversational video, V2X messages, IMS signaling, real-time gaming, and various other service classes. QoS parameters in 3GPP TS 23.203 include resource type, packet error loss rate, packet delay budget, and priority, though various other QoS parameters are possible.

Existing standards and technologies may be inadequate for providing appropriate service quality, or QoS, to certain applications. For example, the latency-sensitive app 622 may constitute an online or real-time game application, i.e., a mobile game with various online functions. The 3GPP TS 23.203 standard includes a real-time gaming service class, QCI3, which specifies a packet delay budget of 50 ms for real-time gaming traffic. Certain games may demand or benefit from much lower packet delay budgets. Furthermore, different mobile games, as well as different stages and users of certain games, may have varying latency requirements. For example, some real-time strategy games may tolerate relatively low latencies up to, e.g., 150 ms. Some entry-level multiplayer games may target a latency of, e.g., 100 ms, while some more competitive or advanced multiplayer games may target a latency of less than, e.g., 60 ms. Certain other multiplayer games, such as certain multiplayer combat games, may in some contexts demand even lower traffic latencies of, e.g., 40 ms. For example, some (e.g., more experienced or competitive) users or gameplay experiences of a certain multiplayer game may have lower latency preferences or demands than other users or gameplay experiences of the game, and hence may not be accommodated by a uniform QoS configuration, e.g., a QoS configuration dictated by the QCI3 real-time gaming service class.

Current standards and technologies may lack explicit latency targets and jitter targets for application traffic, may not accommodate measurements of application traffic latency, and may not provide for latency and jitter measurements to be reported from the UE to the network in order to dynamically calibrate and optimize QoS. For example, the real-time gaming class QCI3 in 3GPP TS 23.203 lacks an explicit latency requirement or jitter requirement for dedicated bearers of application traffic. Thus, in some contexts, current technologies may not provide sufficiently flexible, adaptive, and/or appropriate QoS for a given application, e.g., the latency-sensitive app 622, and, more particularly, may be unable to provide adequate latency for certain application communications conducted over a particular bearer (e.g., an EPS dedicated bearer). Inadequate QoS may interfere with and limit app experience and usability, i.e., may reduce user experience, or quality of experience (QoE). Thus, improvements in the field are desirable.

Application communication latency includes processing delays and transmission delays. Transmission delays may be reduced or calibrated by adjusting the configuration of the communication link between the UE and cellular network, i.e., the configuration of the air interface of the bearer of certain application communications. Embodiments disclosed herein include improved means of adaptively configuring the air interface (or the bearer) to provide enhanced QoS capabilities for app-specific communications. Note that some example components of these improved embodiments are described immediately below with regard to FIG. 6, while methods for achieving enhanced QoS capabilities, according to some embodiments, are further detailed further below with regard to FIG. 7.

As used herein, "enhanced" QoS refers to QoS that is more appropriate for a given application or application process, and may include more flexible, more adaptive, and/or more customizable or app- or UE-defined QoS handling. In some cases, "enhanced" QoS may refer to QoS with lower latency and lower jitter, but enhanced QoS may also refer generally to network communication service quality that more closely meets the preferences or requirements of the communications and experiences of the application, user, and/or network.

According to some embodiments, the UE may contain an entity and interface that provides UE applications with a means of requesting and accessing enhanced QoS capabilities as disclosed herein, referred to as a "QoS Entity" 610, as shown. The latency-sensitive app 622 may access the QoS Entity 610 by means of a defined interface, e.g., the "QoS API" 612, in order to request enhanced QoS functionality for its communications.

Note that some applications on the UE, e.g., the legacy app 624 as shown, may not be configured to access enhanced app-determined QoS functions as disclosed herein, e.g., via the QoS Entity 610. Thus, unlike the latency-sensitive app 622, some "legacy" applications, e.g., the legacy app 624, may not be configured to access the QoS Entity 610 and may not utilize the app-specific QoS capabilities to adjust the configurations of communication links.

The UE may contain an entity, e.g., the Policy Entity 632, usable for indicating various applications' QoS-related policies, e.g., for indicating the eligibility for and/or the level of access to enhanced QoS capabilities allocated to various applications. The Policy Entity 632 may be updated by an external server, e.g., the Policy Server 630, which may contain information indicating various applications' access to the enhanced QoS capabilities. The QoS Entity 610 may access or communicate with the Policy Entity 632 in order to validate the request by the app 622 for enhanced QoS functions.

The QoS Entity 610 may communicate with the cellular network, e.g., the RAN 602, in order to apply and maintain enhanced QoS for the application's communication bearer, e.g., the EPS dedicated bearer. The UE (or the QoS Entity 610 on the UE) and the RAN 602 may perform a QoS negotiation process, which in some embodiments may involve the UE sending an RRC message that indicates a requested QoS configuration or requested QoS parameters to the RAN. Subsequent processes may further establish, maintain, and adjust the QoS configuration of app-related wireless communications. These processes, and generally methods by which the UE 606 and the cellular network may establish and adjust an enhanced QoS configuration, are further detailed below with regard to FIG. 7.

Figure 7:
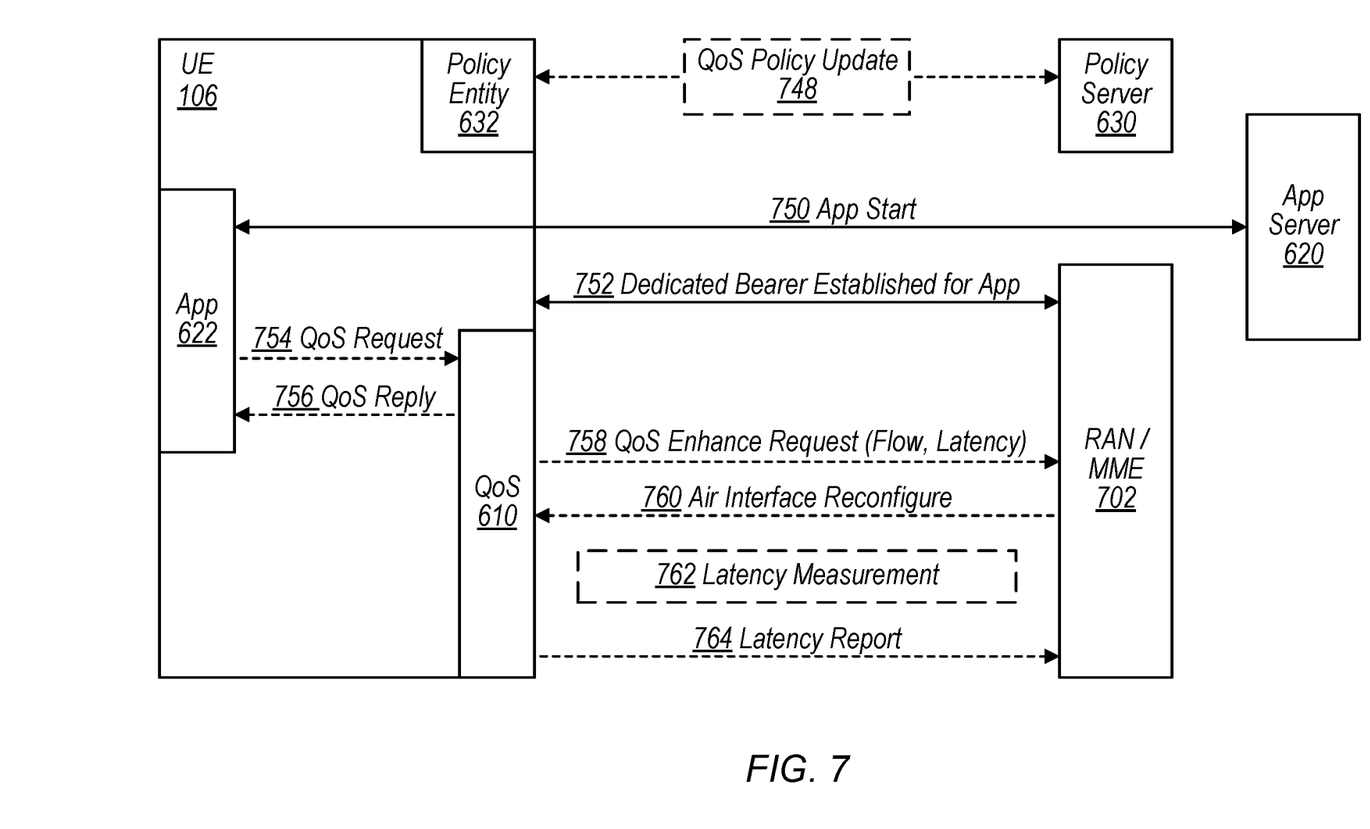
FIG. 7 illustrates a method for a UE to establish and dynamically adjust an enhanced QoS configuration for an application's latency-sensitive communications, according to some embodiments.

FIG. 7—Configuring App-Determined QoS for Latency-Sensitive Communications

FIG. 7 illustrates a method for a UE to establish and adjust an enhanced QoS configuration for certain latency-sensitive wireless communications of an application on the UE, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed.

A UE 106 ("UE") may be camped on or registered with a base station comprising part of a radio access network (RAN). The RAN may provide connectivity between the UE 106 and a core network, e.g., an Evolved Packet Core (EPC) in the case of some LTE embodiments. The EPC may include various entities, including a Mobile Management Entity (MME), as described above with regard to FIG. 3. Both the RAN and the core network (e.g., the EPC, MME etc.) may be considered components of a cellular network 702 (labeled the RAN/MME 702).

The UE 106 may comprise various entities usable for performing app-specific QoS enhancement. These may include a QoS Entity 710, a Policy Entity 632, and an application (or app) 622, as described above with regard to FIG. 6.

The app 622 may be a latency-sensitive application that performs at least some latency-sensitive wireless communications, and may be configured to utilize app-specific QoS enhancement capabilities as described herein. For example, the app 622 may be a game application, e.g., an online or real-time mobile game application, whose gameplay experience and functionality demand high-speed and reliable communications with a server associated with the application, i.e., the server or app server 620.

At 750, the app 622 may initiate a connection or data session between the UE 106 and the app server 620 for conducting application traffic. Various user actions and/or application processes may trigger the initiation of the data session. For example, the data session may be initiated by a user of the UE 106 providing input that causes the app to start up or that starts a certain application process. In the case of a game application, certain gameplay circumstances or the start of a certain game iteration or stage of gameplay may trigger the initiation of the data session, among other possibilities.

At 752, the cellular network 702, e.g., the EPC and RAN, may perform a procedure to establish a "pipeline" or bearer for application traffic conducted between the UE 106 and the app server 620. The bearer may constitute a dedicated bearer, e.g., an EPS (Evolved Packet-Switched System) dedicated bearer, which may be configured with certain service quality or QoS parameters as described above with regard to FIG. 6. For example, the network may specify an initial or default QoS configuration for the bearer, which may guarantee or target a certain QoS. Thus, the app 620 may be able to perform communications with the app server 620 via the cellular network 702 using the bearer.

The UE 106, e.g., the app 622, may determine whether to request an enhanced, app-specific or app-determined QoS configuration for the bearer and/or may determine details of the QoS configuration to request. In some embodiments, the app server 620 may determine whether QoS enhancement for the bearer of the app 622 should be requested, and/or determine recommended QoS configuration parameters for the bearer. The app server 620 may check a carrier profile and/or user profile associated with the app 622 or user to inform these determinations. The app server may then communicate information to the app 622 indicating that the app 622 should request an enhanced QoS configuration.

In some embodiments, access to enhanced QoS capabilities, or to a certain level or category of enhanced QoS capabilities, may be restricted to certain types of communications of the application and/or to certain circumstances of the application. In some embodiments, access to certain enhanced QoS capabilities may be restricted to certain users or user profiles. For example, a user of the app 622 may have subscribed to a service that includes enhanced QoS access for the app. In some embodiments, e.g., in the case that the app 622 is a game application, the user may have previously provided payment for or otherwise gained access to the enhanced QoS function in order to experience enhanced gameplay or to access certain types of gameplay that use enhanced QoS.

At 754, if it is determined that enhanced QoS capabilities should be requested, the app 622 may communicate a request for an enhanced QoS configuration of the bearer, e.g., a "QoS request", to the QoS Entity 710. In some embodiments, the app 622 may use a defined QoS API to access the QoS Entity 710 on the UE in order to perform the QoS request. The app 622 may communicate various information to the QoS Entity 710 as part of the QoS request procedure, such as characteristics of the application and bearer and details regarding the requested QoS configuration, such as latency requirements and jitter requirements for application traffic.

At 756, the QoS Entity 710 may verify the QoS request at 754, and may respond to the app 622. The UE 106 may perform various procedures and access various information in order to verify the QoS request. In some embodiments, the QoS Entity 710 may access certain enhanced QoS policy information, e.g., via the Policy Entity 632 on the UE, which may contain information indicating a configuration of access to the enhanced QoS capabilities allocated to the app 622.

In some embodiments, the Policy Entity 632 may be (or may have been) updated by an external server, e.g., the Policy Server 630, which may perform policy control, i.e., may control authentication and authorization regarding various applications' access to the enhanced QoS capabilities. For example, as shown at 748, the Policy Entity 632 and Policy Server 630 may perform or may routinely perform a "QoS Policy Update" procedure, whereby the Policy Entity may be configured with information indicating access to enhanced QoS capabilities allocated to one or more applications.

Thus, in some embodiments, the QoS Entity 710 may access or communicate with the Policy Entity 632 in order to verify the request by the app 622 for enhanced QoS functionality. In some embodiments, the QoS Entity may communicate a "QoS response" to the app 622. If it is determined that the app's QoS request is valid, then the UE 106 may perform a procedure with the cellular network 702 in order to modify the QoS of the bearer, i.e., may perform a "QoS negotiation" procedure with the network.

At 758, as part of the QoS negotiation procedure, the UE 106 (e.g., the QoS Entity on the UE) may communicate information to the network (e.g. more specifically, the RAN 702 or the base station) indicating an enhanced QoS configuration for the bearer of the app 622, i.e., may send a "QoS Enhance Request" to the network (or base station). In some embodiments, the UE and the base station may perform a Radio Resource Control (RRC) connection reconfiguration procedure. The UE may send an RRC message to the base station that includes the "QoS Enhance Request" information indicating an enhanced QoS configuration, e.g., as an information element (IE) contained in the RRC message. In some embodiments, the RRC message may constitute an assistance information message, or "UEAssistanceInformation" message, typically usable for indicating UE assistance information to the RAN (or base station).

The QoS Enhance Request may include various information, such as a latency target and a jitter target for the bearer, information specifying the relevant application and bearer, and/or other possible details. Example contents of the QoS Enhance Request, i.e., the information sent from the UE to the base station to indicate a targeted QoS configuration, are further detailed below with regard to FIG. 8. In some embodiments, prior to transmitting the QoS Enhance Request, the UE may obtain a measurement of the current QoS of the bearer to see if the QoS Enhance Request is necessary. If the measurement indicates that the QoS currently being provided on the bearer is adequate (e.g., is at least equal to the enhanced QoS that would be requested, then the UE may not transmit the QoS Enhance Request. Alternatively, if the measurement indicates that the QoS currently being provided on the bearer is inadequate (e.g., is less than the enhanced QoS that may be requested), then the UE may transmit the QoS Enhance Request.

At 760, the cellular network, e.g., the base station, may reconfigure the air interface of the bearer of the application traffic. The network may adjust the QoS configuration of the bearer based on the QoS Enhance Request information received from the UE 106 in order to achieve an enhanced QoS configuration as indicated or targeted by the application 622. The cellular network 702 (e.g., including the base station) may use various mechanisms to adjust the QoS of the air interface. For example, the network may adjust various QoS parameters, e.g., as described above with regard to FIG. 6, and may utilize various traffic prioritization, resource reservation control, and/or other mechanisms in order to achieve an enhanced QoS for the application traffic.

The UE 106 and cellular network 702 may perform routine procedures and communications in order to maintain and adaptively adjust the enhanced QoS configuration established at 760. At 762, the UE 106 may perform a QoS measurement procedure, which may include obtaining measurements, i.e., measuring, the latency and jitter as well as other characteristics of the QoS of the application traffic conducted over the bearer. The UE 106 may measure latency of the application traffic by various means. In some embodiments, the UE may "ping" the app server 620 in order to measure the latency. In some embodiments, the latency measurement may constitute the round-trip delay of communications between the UE and the server, i.e., the time taken for a single communication to travel from the UE to the destination and then for a response to return to the UE. The UE may transmit a message (e.g., a packet) to the app server and then receive a response (e.g., an acknowledgment or ACK message), and measure the time that passed between transmitting the message and receiving the response in order to obtain a latency measurement.

At 764, the UE 710 may communicate the QoS-related measurements to the cellular network 702, e.g., the RAN or base station, i.e., may communicate a "latency report" to the network. In some cases, the network may adaptively reconfigure the QoS of the air interface of the bearer based at least in part on the received latency report. For example, if the latency report indicates that application traffic conducted over the bearer is experiencing a higher latency than targeted or demanded by the app 622, the base station may reconfigure the air interface to better achieve the targeted latency. In this way, the cellular network may operate to "tune" the QoS configuration of the bearer dynamically based on the QoS-related measurements made by the UE and provided to the network.

In some embodiments, the cellular network 702 and/or application server 620 may take or participate in taking QoS-related measurements related to the application traffic air interface usable to modify and improve the QoS configuration of the bearer/air interface. In some embodiments, the cellular network (e.g., the base station) may consider various other network factors, such as the QoS demands of other traffic on the network (which may be associated with other UE devices or other applications), in order to inform adjustments of the QoS configuration of the air interface of the app 622.

The latency measurement and latency report operations at steps 762 and 764 may repeat in order to dynamically maintain and adjust the QoS configuration of the air interface of the application traffic. For example, the UE 106 may perform latency measurement procedures with a definite or variable frequency, e.g., every 1, 2, 5, or 10 seconds.

The UE 106 may adjust the frequency with which it performs one or more measurements (at 762) and/or when and which measurements are sent to the network (at 764) based on various factors. For example, if the UE takes new latency measurements that are determined to be similar to recent previous latency measurements communicated to the network to a certain degree, then the UE may operate to not communicate the new latency measurements to the network, or may communicate the latency measurements to the network less frequently, e.g., until a greater variation in latency is detected or a certain period of time passes. In some embodiments, the UE may adjust the frequency with which it takes and/or provides measurements based on other factors, such as the degree of mobility (degree of current movement) of the UE, the geographic location of the UE, and/or current gameplay conditions. Thus, if the UE has been relatively stationary since its last measurement, the UE may not take a new measurement, or may reduce the frequency of measurements, based on the assumption that network channel conditions have not changed. In addition, if current gameplay conditions are such that communication traffic demands are lowered, then measurements may be temporarily suspended or reduced in frequency. Similarly, if no user input to the game has been received since a last measurement, indicating that the user may have stopped playing the game, then UE may not take a new measurement until user input is received, or may reduce the frequency of measurements.

As mentioned above, in some embodiments, the QoS measurement procedure may be performed before or during the initial enhanced QoS negotiation procedure at 758 and 760, i.e., before an enhanced QoS configuration is established. Various other methods of taking QoS measurements and reporting them to the cellular network are possible.

In some embodiments, the above-described method may be repeated for a newly established or re-established bearer in order to provide the bearer with enhanced QoS. In some cases, the UE 702 may host multiple applications associated with multiple bearers, which may take advantage of enhanced QoS capabilities as described herein.

The flexible, app-determined enhanced QoS configuration achieved by the above-described method may result in an improved user experience. Enhanced QoS capabilities as described herein may enable or improve certain application functionality and/or may enhance the performance of the application, as well as, in some cases, improve overall network traffic management.

Figure 8:
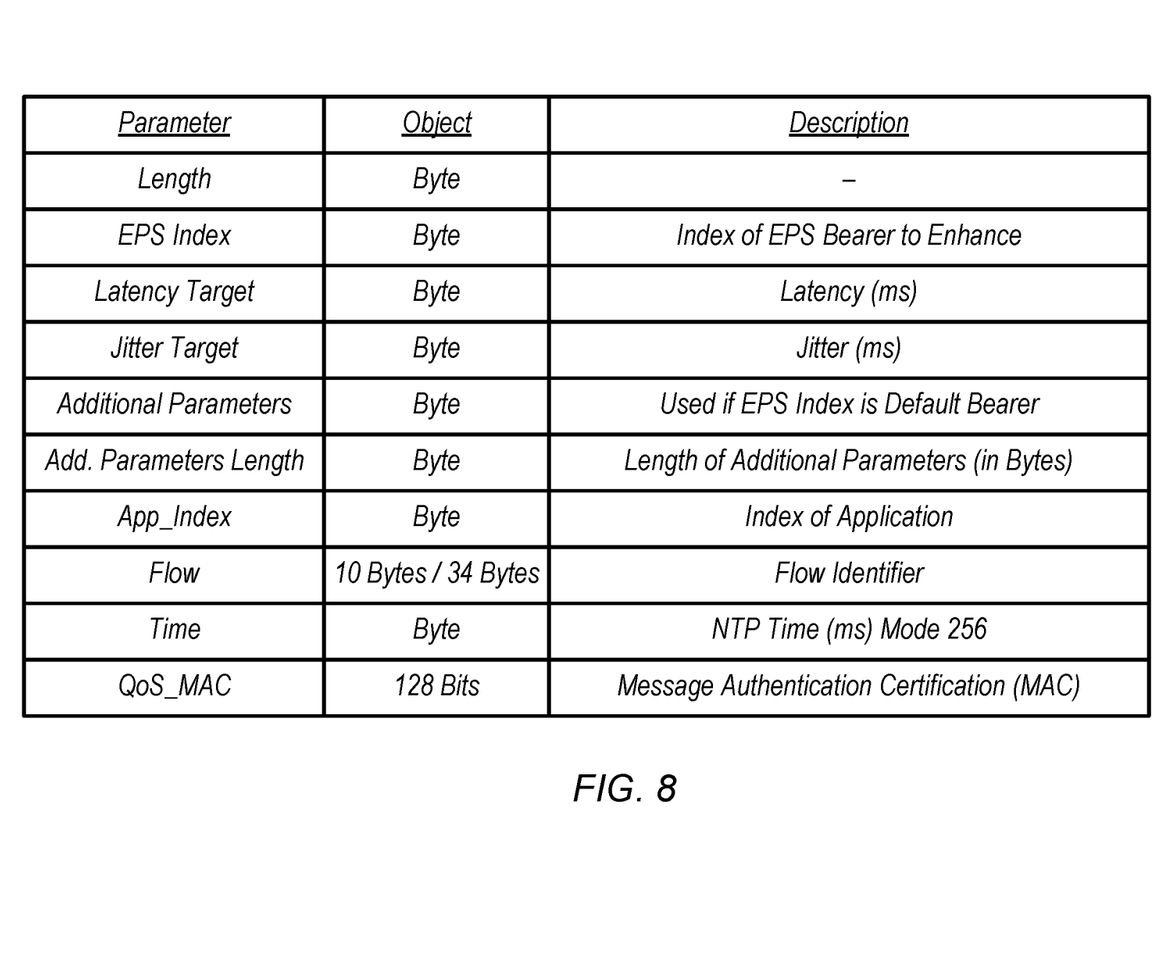
FIG. 8 is a table illustrating example contents of a message sent from a UE to a base station to indicate requested QoS parameters for latency-sensitive communications of an application, according to some embodiments.

FIG. 8—Example QoS Enhancement Request Message Information

FIG. 8 is a table illustrating example information sent from a UE to a base station to request or indicate an enhanced QoS configuration for an air interface or bearer of latency-sensitive communications of an application, according to some embodiments.

As described above with regard to step 758 of FIG. 7, a UE (e.g., UE 106) may communicate information to a cellular network (e.g., a RAN or base station) indicating a requested QoS configuration or requested QoS parameters for a bearer (e.g., an EPC dedicated bearer) used to convey traffic between a latency-sensitive application and a server. This information communicated from the UE to the cellular network (e.g., the base station) may be termed a "QoS Enhance Request", or "QoS Enhance Request" message. As described above with regard to FIG. 7, various processes and checks may have been performed by various entities in order to authorize the communication of the QoS Enhance Request by the UE, as well as to construct and determine the contents of the request.

As mentioned above, the QoS Enhance Request information may be included as part of a Radio Resource Control (RRC) message sent to the base station, e.g., may be included as an information element (IE) contained in the RRC message. Thus, the QoS Enhance Request may be referred to as "the IE". In some embodiments, the RRC message that includes the IE may constitute an assistance information message, or "UEAssistanceInformation" message, which may be usable for conveying UE assistance information to the base station.

The QoS Enhance Request, i.e., the IE, may include various information, such as parameters indicating a requested QoS, details specifying the relevant application and its bearer, and/or details regarding the IE itself usable for receiving and/or processing the IE.

As shown, the IE may include a length field, which may indicate the length of the IE, and may be usable to correctly receive and process the IE.

The IE may include information specifying the bearer to be enhanced, i.e., the bearer whose QoS configuration is requested to be modified according to the IE. For example, the IE may include an "EPS Index" field containing the index of the bearer, in the case of the bearer being, e.g., an EPS dedicated bearer.

The IE may include parameters indicating the requested QoS of the bearer. These may include a latency target and a jitter target, as shown. In some embodiments, the latency target and/or jitter target parameters may be represented as byte objects, and may indicate times in milliseconds.

The latency target may indicate a targeted duration of time taken for information to be communicated between the UE (or the application) and the server, or along a subset of the link between the UE and the server. In various embodiments, the latency target parameter may constitute a requested latency, a targeted maximum latency, or may indicate a range of appropriate latencies, among other possibilities. Example latency targets may include 40 ms, 55 ms, 70 ms, or various other time durations, depending on the application and/or other circumstances.

The jitter target may indicate a requested level of variation in latencies, or a targeted difference in latencies, across multiple communications between the UE and the server. The latency target and jitter target may be usable by the cellular network, e.g., the base station, to configure or reconfigure the QoS mechanisms of the bearer in order to achieve more appropriate QoS.

The IE may also contain an "additional parameters" field, which may be used in cases where the bearer is a default bearer, e.g., an EPS default bearer. The IE may also contain an "additional parameters length" field indicating the length of the additional parameters field.

The IE may include information indicating the application whose traffic is conducted by the barrier. For example, the IE may include an "app index" field as shown, which may constitute an identifier usable by the cellular network or base station to distinguish the application.

The IE may include a "flow" field, constituting a flow identifier associated with the application traffic. For example, the flow field may indicate an IPv4 or IPv6 TCP data stream, an IPv4 or IPv6 UDP data stream, a QUIC (Quick UDP Internet Connections) connection, or a MPTCP (Multipath TCP) connection, among other possibilities.

The IE may include information for the purpose of providing security to the UE and/or to the network. For example, the IE may include a field used to verify the IE, i.e., to authenticate the IE (and/or the UE or application, etc.). For example, the IE may include a time field that may be used as input for a hash function, e.g., for SHA-384 or another hashing algorithm.

The IE may include information usable to verify or certify the QoS Enhance Request. For example, the IE may include a Message Authentication Certification (MAC) field (e.g., a "QoS MAC" field as shown), which may, e.g., constitute 128 bits of data.

Note that the information shown is merely an example of QoS Enhance Request information, and in some embodiments various information shown may not be included and/or various information not shown may be included.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
at least one processor configured to cause a user equipment (UE) to:
establish a bearer with the cellular network for conducting traffic between an application executing on the UE and a server;
determine whether the application is eligible for an enhanced quality of service (QoS) configuration of the bearer;
transmit information in a radio resource control (RRC) connection reconfiguration procedure to the cellular network indicating requested QoS parameters for the bearer in response to a determination that the application is eligible for the enhanced QoS configuration, wherein the information includes an indication of the bearer and one or more of a latency and jitter target;
perform first wireless communication associated with the application with the cellular network using the bearer, wherein the first wireless communication is conducted according to a first QoS configuration based on the requested QoS parameters.

2. The apparatus of claim 1,
wherein the at least one processor is further configured to cause the UE, after performing the first wireless communication, to:
obtain a QoS measurement of the bearer;
communicate the QoS measurement to the cellular network;
perform second wireless communication with the cellular network after communicating the QoS measurement to the cellular network, wherein the second wireless communication is conducted according to a second QoS configuration based on the QoS measurement communicated to the cellular network.

3. The apparatus of claim 2,
wherein the at least one processor is further configured to cause the UE to obtain the QoS measurement of the bearer and communicate the QoS measurement to the cellular network a plurality of times during execution of the application on the UE;
wherein the QoS configuration of the bearer is adjusted after at least a subset of the plurality of times that the UE performs the QoS measurement of the bearer and communicates the QoS measurement to the cellular network.

4. The apparatus of claim 1,
wherein the at least one processor is further configured to cause the UE to:
obtain a QoS measurement of the bearer after determining that the UE is permitted to request an enhanced quality of service (QoS);
wherein the UE transmits information to the cellular network indicating requested QoS parameters in response to the QoS measurement indicating that a current QoS of the bearer is inadequate for the application.

5. The apparatus of claim 1, further comprising:
a memory which stores a software program which contains information regarding which applications are eligible to request an enhanced QoS;
wherein, in determining whether the application is eligible for an enhanced QoS configuration of the bearer, the application executing on the UE is configured to access the software program.

6. The apparatus of claim 5,
wherein the UE is further configured to access a remote policy server in order to update information in the software program.

7. The apparatus of claim 1,
wherein the at least one processor is further configured to cause the UE to:
receive an indication from the server that the UE should request an enhanced quality of service from the cellular network;
wherein the UE is configured to transmit information to the cellular network indicating requested QoS parameters in response to the indication from the server that the UE should request an enhanced quality of service from the cellular network.

8. The apparatus of claim 1,
wherein the requested QoS parameters are stored in the application on the UE.

9. The apparatus of claim 1,
wherein the at least one processor is further configured to cause the UE to:
determine that payment has been provided for access to an enhanced QoS configuration of the bearer during execution of the application;
wherein the UE is configured to transmit the information to the cellular network indicating requested QoS parameters for the bearer in response to the determination that payment has been provided.

10. A method for executing an online gaming application on a user equipment (UE) operating in a cellular network, the method comprising:
performing, by the UE:
executing the online gaming application on the UE, wherein the online gaming application requires communication with a gaming server coupled to the cellular network;
establishing a bearer with the cellular network for conducting traffic between the online gaming application executing on the UE and the gaming server;
determining whether the online gaming application is eligible to receive an enhanced quality of service (QoS) configuration;
transmitting, to the cellular network, information in a radio resource control (RRC) connection reconfiguration procedure indicating requested QoS parameters for the bearer in response to determining that the online gaming application is permitted to receive the enhanced QoS configuration, wherein the QoS parameters are usable in adjusting a QoS configuration of the bearer, and wherein the information includes an indication of the bearer and one or more of a latency and jitter target;
receiving first wireless communication associated with the online gaming application from the cellular network using the bearer, wherein the first wireless communication is received according to a first QoS configuration based on the requested QoS parameters.

11. The method of claim 10, further comprising:
performing, by the UE:
obtaining a QoS measurement of the bearer during execution of the online gaming application;
communicating the QoS measurement to the cellular network, wherein the QoS measurement is usable in adjusting a QoS configuration of the bearer;
receiving second wireless communication associated with the online gaming application from the cellular network using the bearer, after communicating the QoS measurement to the cellular network, wherein the second wireless communication is received according to a second QoS configuration, wherein the second QoS configuration is based on the QoS measurement communicated to the cellular network.

12. The method of claim 10, further comprising:
performing, by the UE:
storing a software program in a memory of the UE which contains information regarding which applications are eligible to request an enhanced QoS;
wherein said determining whether the online gaming application is eligible for an enhanced QoS configuration of the bearer comprises the online gaming application accessing the software program.

13. The method of claim 10,
wherein said transmitting information to the cellular network indicating requested QoS parameters for the bearer comprises:
creating an information element which contains the requested QoS parameters; and
transmitting the information element in the RRC message to the cellular network.

14. The method of claim 10, further comprising:
performing, by the UE,
receive an indication from the gaming server that the UE should request an enhanced quality of service from the cellular network for the online gaming application;
wherein said transmitting requested QoS parameters for the bearer to the cellular network in response to receiving the indication from the gaming server.

15. A cellular base station, comprising:
at least one antenna for performing wireless communications;
a radio coupled to the at least one antenna; and
a processing element coupled to the radio;
wherein the cellular base station is configured to:
establish a bearer with a user equipment (UE) for conducting traffic between an application executing on the UE and a server, wherein the bearer has a first quality of service (QoS) configuration;
receive, from the UE, a request for enhanced QoS for the bearer, wherein the request for enhanced QoS includes information in a radio resource control (RRC) connection reconfiguration procedure indicating requested QoS parameters for the bearer, wherein the request is received in response to a prior determination that the UE is permitted to request the enhanced QoS, and wherein the information includes an indication of the bearer and one or more of a latency and jitter target;
configure the bearer with a second QoS configuration in response to the request for enhanced QoS received from the UE, wherein the second QoS configuration is enhanced relative to the first QoS configuration;
transmit first wireless communication associated with the application to the UE using the bearer, wherein the bearer is configured according to the second QoS configuration.

16. The cellular base station of claim 15,
wherein the cellular base station is further configured to:
receive a QoS measurement of the bearer from the UE;
adjust a current QoS configuration of the bearer in response to the received QoS measurement;
wherein the cellular base station is configured to adjust the current QoS configuration of the bearer in response to the received QoS measurement in order to achieve the requested QoS parameters for the bearer.

17. The cellular base station of claim 16,
wherein the cellular base station is further configured to receive the QoS measurement of the bearer from the UE and adjust a current QoS configuration of the bearer in response to the received QoS measurement a plurality of times during transmission of communications to the application executing on the UE.

18. The cellular base station of claim 15,
wherein the cellular base station is further configured to:
transmit a request for permission to enhance the QoS of the bearer in response to receipt of the request for enhanced QoS of the bearer from the UE;

receive permission to enhance the QoS of the bearer in response to the request for permission.

19. The cellular base station of claim 15,
wherein the cellular base station is configured to adjust a current QoS configuration of the bearer in response to the received QoS measurement and also in response to current network traffic conditions.

20. The cellular base station of claim 15,
wherein the requested QoS parameters are stored in an application on the UE.

\* \* \* \* \*